(12) United States Patent
Anaya Chamorro et al.

(10) Patent No.: US 10,735,173 B2
(45) Date of Patent: Aug. 4, 2020

(54) CARRIER AGGREGATION INTER ENB ACTIVATION

(71) Applicant: VODAFONE IP LICENSING LIMITED, Newbury, Berkshire (GB)

(72) Inventors: Luis Manuel Anaya Chamorro, London (GB); Hisham Elshaer, London (GB); Neil Scully, London (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 15/324,230

(22) PCT Filed: Jul. 10, 2015

(86) PCT No.: PCT/GB2015/052003
§ 371 (c)(1),
(2) Date: Jan. 5, 2017

(87) PCT Pub. No.: WO2016/005765
PCT Pub. Date: Jan. 14, 2016

(65) Prior Publication Data
US 2017/0201366 A1    Jul. 13, 2017

(30) Foreign Application Priority Data

Jul. 10, 2014    (GB) .................................. 1412265.9

(51) Int. Cl.
*H04L 5/00*    (2006.01)
*H04W 24/08*    (2009.01)
(Continued)

(52) U.S. Cl.
CPC ........... *H04L 5/0098* (2013.01); *H04W 24/08* (2013.01); *H04W 28/0231* (2013.01);
(Continued)

(58) Field of Classification Search
None
See application file for complete search history.

(56) References Cited

U.S. PATENT DOCUMENTS 9,094,917 B2 *   7/2015   Charbit ................. H04L 5/0032
2011/0267978 A1   11/2011   Etemad
(Continued)

FOREIGN PATENT DOCUMENTS

WO    2012171587 A1    12/2012

OTHER PUBLICATIONS

Search Report issued in GB1412265.9 dated Nov. 12, 2014.
(Continued)

*Primary Examiner* — Steve R Young
(74) *Attorney, Agent, or Firm* — Workman Nydegger

(57) ABSTRACT

A method for deciding on the activation of carrier aggregation across first and second base stations of a cellular network for delivering a service to a mobile terminal is provided. The decision is made on the basis of a combination of a plurality of parameters. One parameter is associated with a performance of the cellular network. One parameter is associated with a Quality of Service requirement of the service. One parameter is associated with a state of the mobile terminal and/or a subscriber associated with the mobile terminal. One parameter is associated with a radio link between the mobile terminal and the first base station and/or second base station.

12 Claims, 8 Drawing Sheets

(51) Int. Cl.
*H04W 28/02* (2009.01)
*H04W 72/08* (2009.01)
*H04W 72/04* (2009.01)
*H04W 52/02* (2009.01)

(52) U.S. Cl.
CPC ...... *H04W 72/087* (2013.01); *H04W 52/0277* (2013.01); *H04W 72/0453* (2013.01); *Y02D 70/00* (2018.01); *Y02D 70/1262* (2018.01); *Y02D 70/1264* (2018.01); *Y02D 70/164* (2018.01)

(56) References Cited

U.S. PATENT DOCUMENTS

| | | | |
|---|---|---|---|
| 2012/0077445 A1* | 3/2012 | Konno | H04L 5/001 455/67.11 |
| 2012/0176926 A1 | 7/2012 | Jang et al. | |
| 2013/0188473 A1* | 7/2013 | Dinan | H04W 56/0005 370/216 |
| 2013/0188612 A1* | 7/2013 | Dinan | H04W 56/0005 370/336 |
| 2013/0229931 A1* | 9/2013 | Kim | H04W 24/10 370/252 |
| 2013/0329583 A1* | 12/2013 | Vrzic | H04W 36/30 370/252 |
| 2015/0029917 A1* | 1/2015 | Kim | H04W 52/0209 370/311 |
| 2015/0071192 A1* | 3/2015 | Moilanen | H04W 76/10 370/329 |
| 2015/0092712 A1* | 4/2015 | Kim | H04L 5/001 370/329 |
| 2015/0257163 A1* | 9/2015 | Dalsgaard | H04W 72/042 455/452.2 |
| 2016/0309486 A1* | 10/2016 | Hinkle | H04W 72/087 |
| 2017/0325211 A1* | 11/2017 | Guo | H04W 72/048 |

OTHER PUBLICATIONS

International Search Report and Written Opinion issued in PCT/GB2015/052003 dated Sep. 15, 2015.
Nokia Corporation et al. "Comparison of CC Management Strategies" 3GPP Draft, R2-103513, Jun. 22, 2010.
Ingemann et al. "Carrier Aggregation for LTE-Advanced: Functionality and Performance Aspects" IEEE Communications Magazine, vol. 49, No. 6, Jun. 1, 2011.
Intel Coprporation "Dynamic Carrier Activation and Deactivation" 3GPP Draft, R2-100582, Jan. 12, 2010.

* cited by examiner

CARRIER AGGREGATION INTER ENB ACTIVATION

CROSS REFERENCE TO RELATED APPLICATIONS

This application is a U.S. Nationalization of PCT Application Number PCT/GB2015/052003, filed on Jul. 10, 2015, which claims priority to GB Patent Application No. 1412265.9, filed on Jul. 10, 2014, the entireties of which are incorporated herein by reference.

TECHNICAL FIELD OF THE INVENTION

The invention concerns a method for deciding on the activation of carrier aggregation on first and second base stations of a cellular network for delivering a service to a mobile terminal and a network entity configured to operate accordingly.

BACKGROUND TO THE INVENTION

A conventional cellular network comprises a plurality of base stations, each base station transmitting to one or more mobile terminals (each referred to as a respective User Equipment or UE) using at least one respective carrier. In particular, the Third Generation Partnership Project (3GPP) have specified Long Term Evolution (LTE) architectures, in which each base station (called an eNodeB or eNB in this context) transmits downlink signals to UEs using one or more Orthogonal Frequency Division Multiplexed (OFDM) carriers. Each carrier occupies a frequency bandwidth and therefore defines a data rate capacity for delivering services to the UEs.

Carrier aggregation allows a UE to be served by multiple different carriers at the same time, allowing flexible allocation of data transmission to those carriers. This may increase the data rate that can be communicated between the network and the UE, for instance allowing a UE to reach a high peak data rate by being provided with access to more spectrum. Although originally only standardised for aggregation between two carriers on the same eNB (intra-eNB carrier aggregation), in 3GPP Release 12, aggregation between two carriers on different eNBs is being standardised (inter-eNB carrier aggregation). The specification work is intended to define the way and amount of information to be exchanged (signalling mechanisms) so that aggregation is successfully achieved. Inter-eNB carrier aggregation is most relevant between a macro cell and a small cell and it would typically be used where the coverage areas of the base stations intersect.

Referring first to FIG. 1, there is shown a schematic diagram of a part of a network architecture to permit inter-eNB carrier aggregation. A Master eNB 20 and a Secondary eNB 30 each communicate with a UE 60 using a respective Uu (air) interface 65. An Mobility Management Entity (MME) 70 interfaces with a Home Subscriber Server (HSS) 80 and the MME 70 communicates with the Master eNB 20 and the Secondary eNB 30 over respective S1 interfaces 75. Moreover, the Master eNB 20 and the Secondary eNB 30 can communicate with each other over an Xn interface 50. The Xn interface allows the Master eNB 20 and the Secondary eNB 30 to exchange information and for the Master eNB 20 to control the Secondary eNB 30 if required. The Secondary eNB 30 may also make autonomous decisions. Typically (although not necessarily), the Master eNB 20 is a macro cell and the Secondary eNB 30 is a small cell.

One generalised approach for inter-eNB carrier aggregation is discussed in WO-2012/136256. Thus, a carrier may be aggregated at the UE 60, such that Master Base Station (MeNB) 20 transmits carrier frequency X to the UE and Secondary Base Station (SeNB) 30 transmits carrier frequency Y to the UE. The additional, aggregated carrier is referred to as a Secondary Cell (SCell).

3GPP Technical Report (TR) 36.842 v12.0.0 discusses particular techniques for implementing inter-eNB carrier aggregation. Referring to FIGS. 2A and 2B, there are illustrated techniques discussed in this document that have been standardised by 3GPP based on the network architecture shown in FIG. 1. Where the same features are indicated as in FIG. 1, identical reference numerals have been used.

FIG. 2A shows a first technique (referred to as "Alternative 1A" in 3GPP TR 36.842 v12.0.0). Service data 10 is provided to the Master eNB 20 and the Secondary eNB 30 from the MME 70 over the respective S1 interfaces 75. This service data 10 comprises two bearers (for example, voice and data respectively). The bearers are split: one bearer is communicated to the UE 60 through the Master eNB 20; and the other bearer is communicated to the UE 60 through the Secondary eNB 30. Each eNB has respective Packet Data Convergence Protocol (PDCP), Radio Link Control (RLC) and Media Access Control (MAC) layers for processing the bearers.

FIG. 2B depicts a second technique (referred to as "Alternative 3C" in 3GPP TR 36.842 v12.0.0). In this architecture, a single bearer of the service data 10 can be split between the Master eNB 20 and the Secondary eNB 30. In the illustration shown, the Master eNB 20 receives two bearers and one bearer is split at the PDCP layer between it and the Secondary eNB 30. The portion of the bearer for transmission by the Secondary eNB 30 is communicated from the Master eNB 20 to the Secondary eNB 30 over the Xn interface 50. This portion of the bearer is then processed at the RLC and MAC layers by the Secondary eNB 30 for transmission to the UE 60.

Some approaches exist to address a number of issues relating to Inter-eNB carrier aggregation. For example, WO-2013/143051 discusses power saving techniques for inter-eNB carrier aggregation and US-2014/0078989 discusses how inter-eNB carrier aggregation can be set up.

Carrier aggregation between an eNB and a Node B has previously been considered. WO 2012/171587 describes an apparatus for deciding if data to be transmitted to a UE should transmitted by a slave base station of a second radio access technology (RAT). The decision is based on an availability indication from the slave base station that may comprise, for example, a transmission time delay, an available capacity or a quality of service.

Nevertheless, many significant challenges still remain in the implementation of inter-eNB carrier aggregation, such as when to implement it, which implementation technique to use and how to manage resources between the base stations.

SUMMARY OF THE INVENTION

Against this background, there is provided a method for deciding on the activation of carrier aggregation on first and second base stations of a cellular network for delivering a service to a mobile terminal in accordance with claim 1, a computer program in line with claim 14 and a network entity of a cellular network as defined by claim 15. It should be understood that this method is part of a telecommunications network comprising: at least one UE; a radio access network (RAN); and core network (CN). Preferably, the first and second base stations are configured for use within a Long Term Evolution network architecture. Other preferred features are disclosed with reference to the claims and in the description below.

The decision on activating carrier aggregation in an inter-base station (inter-eNB, when the base stations are LTE-based) is therefore made based on one or more parameters that affect both the quality of the service provided to the mobile terminal using carrier aggregation and the additional resources required to implement carrier aggregation. By using these parameters, an assessment can be made whether inter-base station carrier aggregation is worthwhile and therefore improve efficiency, power consumption and quality of service. Such an assessment may not be as relevant for intra-base station carrier aggregation, where the additional resources required are more centralised and not necessarily as significant.

In particular, the parameters may include: a latency requirement of the service; a minimum bit rate requirement of the service; a mobility state of the mobile terminal; a quality of service state of the mobile terminal (such as a maximum delay tolerance for the mobile terminal); a battery state of the mobile terminal; a transmission power back-off of the mobile terminal state; and a parameter based on an assessment of a change in throughput due to carrier aggregation activation relative to a change in transmission overheads due to carrier aggregation activation.

BRIEF DESCRIPTION OF THE DRAWINGS

The invention may be put into practice in a number of ways, and preferred embodiments will now be described by way of example only and with reference to the accompanying drawings, in which.

DETAILED DESCRIPTION OF PREFERRED EMBODIMENTS

A number of specific embodiments will be discussed below, with reference to a system based on 3GPP LTE Advanced. However, it should not be understood that the invention is limited to such systems. When the term eNB is used below, this may be substituted for a more general base station and likewise, other network entities may be replaced with a generalised entity carrying out a similar function in a different network architecture.

The first embodiment relates to determination of whether to activate carrier aggregation. Then, the second embodiment concerns the selection of a technique for carrier aggregation when activated. Finally, the third and fourth embodiments address resource allocation when carrier aggregation is activated.

Carrier Aggregation Activation Decision

Figure 3:
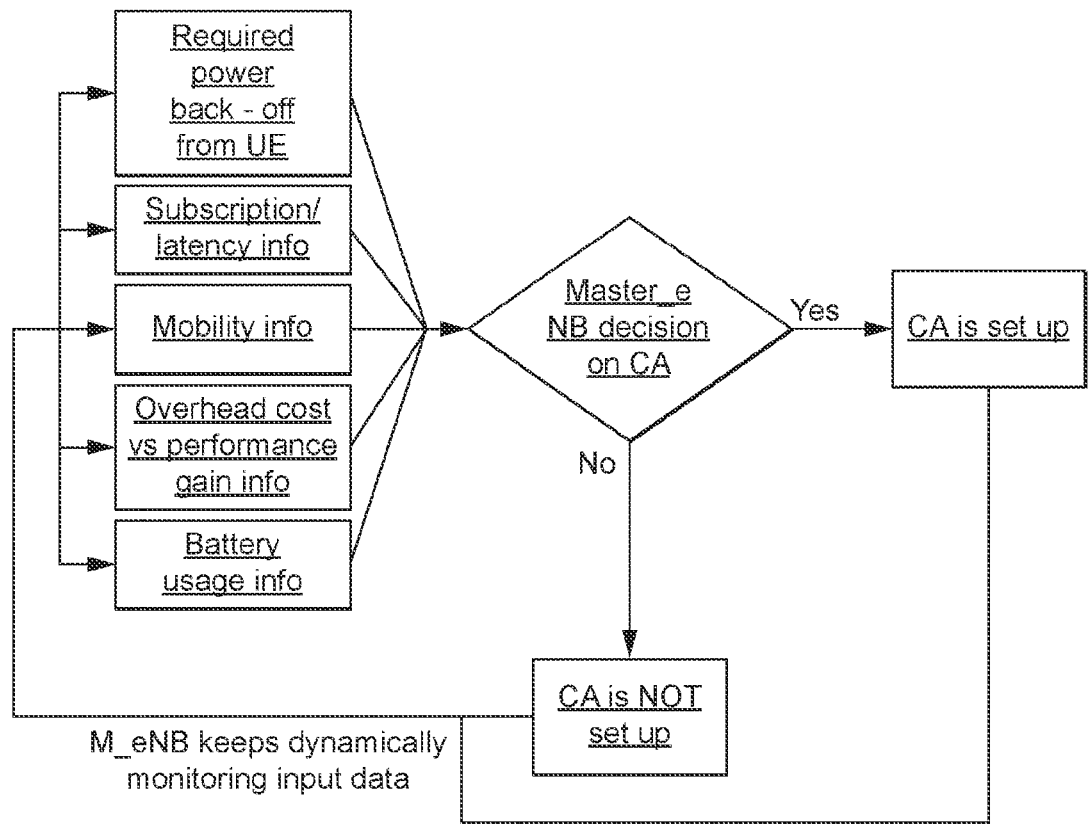
FIG. 3 shows an example flow chart for deciding whether to implement inter-eNB carrier aggregation based on various variables, in accordance with a first embodiment.

Referring first to FIG. 3, there is shown an example flow chart for deciding whether to implement inter-eNB carrier aggregation based on various variables. When configuring carrier aggregation, it has been found that various parameters have an impact on the final user performance. Therefore, the decision to implement carrier aggregation should take at least one and preferably multiple such parameters into account. The parameters found to be most relevant comprise: QoS (such as latency); a UE state, such as mobility or battery usage; and a link state, such as overhead levels or power backoff. These parameters are therefore provided as inputs to a decision process, which takes place at the Master eNB (MeNB). The MeNB is typically a macro cell. Using the provided parameters, the MeNB makes an adequate estimate on the likely performance improvements or degradations due to setting up carrier aggregation for a given UE. This decision process is shown in FIG. 3. Optionally, the default position is that carrier aggregation is not enabled.

Nevertheless, the process need not take place at the MeNB, Secondary eNB (SeNB) or even at another eNB. It could take place at another network entity or at each relevant mobile terminal. Moreover, not all of the parameters discussed above need be used. More generally, this can be understood as a method for deciding on the activation of carrier aggregation across first and second base stations of a cellular network for delivering a service to a mobile terminal.

In particular, the decision may be on the basis of at least one parameter associated with one or more of: a performance of the cellular network; a Quality of Service requirement of the service; a state of the mobile terminal and/or a subscriber associated with the mobile terminal; and a radio link between the mobile terminal and the first base station and/or second base station.

As an alternative, the decision may be on the basis of a combination of a plurality of parameters, at least one parameter being associated with a performance of the cellular network, at least one parameter being associated with a Quality of Service requirement of the service, at least one parameter being associated with a state of the mobile terminal and/or a subscriber associated with the mobile terminal and, at least one parameter being associated with a radio link between the mobile terminal and the first base station and/or second base station.

These more general definitions of the parameters noted above, but the specific parameters will be discussed in more detail below.

The decision may establish whether the benefit of the increased data throughput provided by carrier aggregation outweighs the increased resources required to implement it. In this context, carrier aggregation across the first and second base stations may be understood as aggregating a carrier (or a plurality of carriers) of the first base station and a carrier (or a plurality of carriers) of the second base station in respect of the mobile terminal. The parameters are beneficially considered as part of the signalling process to the mobile terminal. The step of deciding on the activation of carrier aggregation is optionally based on a plurality of these parameters. By monitoring these parameters, it is possible for the mobility management entity (MME), respective base station or UE to determine if carrier aggregation or a sole carrier from the MeNB or SeNB is appropriate for the UE. Optionally, the method may further comprise activation or deactivation of carrier aggregation in response to the step of deciding.

The method may be implemented by means of a computer program, which will cause the steps to be carried out when operated by a processor (or other logic). The computer program may be stored on a computer readable medium. In another aspect, there may be provided a network entity of a cellular network, configured to set an activation state for carrier aggregation based on a decision made in accordance with the method as described herein. The network entity may have structural features (such as respective components, modules or parts) configured to provide the functionality associated with any of the steps discussed herein. The network entity is optionally the first or second base station, the mobile terminal, part of another known network entity or a new network entity.

The input data may come from different points of the network, such as: the UE; MeNB; SeNB; scheduler information at the MeNB; or the core network (for example subscription data). If the MeNB decides to setup carrier aggregation, then another algorithm is run to decide when to stop it based on any change in the input information. If carrier aggregation is not activated, the scheduler at the MeNB dynamically monitors the input data to decide when is best to set up carrier aggregation or not.

In general, configuration of carrier aggregation is a network decision based on UE support for the functionality (which may include secondary band support and carrier aggregation combinations supported). If the UE is able to perform carrier aggregation, the scheduler of the network can decide to activate the Secondary Cell (SCell) and send "Activation/Deactivation MAC control element" to the UE, which in accordance with 3GPP TS 36.321 v.12.2.0:

"if the UE receives an Activation/Deactivation MAC control element in this TTI activating the SCell, the UE shall in the TTI according to the timing . . . :
 activate the SCell; i.e. apply normal SCell operation including:
  SRS transmissions on the SCell;
  CQI/PMI/RUPTI reporting for the SCell;
  PDCCH monitoring on the SCell;
  PDCCH monitoring for the SCell.
 start or restart the sCellDeactivationTimer associated with the SCell . . . " 3GPP TS 36.331 v.12.1.0 section 5.3.3 sets out a procedure for RRC connection establishment with multiple purposes, one of which is the configuring or releasing of an SCell. This procedure is also used to modify an RRC connection, for example to establish, modify or release resource blocks (RBs), to perform handover, to setup, modify or release measurements and to add, modify or release SCells. As part of the procedure, NAS dedicated information may be transferred from E-UTRAN to the UE.

The mechanisms by which the network will decide when and how it is best to enable carrier aggregation across eNBs will now be described. The aggregation across eNBs is subject to certain conditions which may be specific to that scenario and may differ from the normal intra-eNB carrier aggregation scenario.

Figure 4:
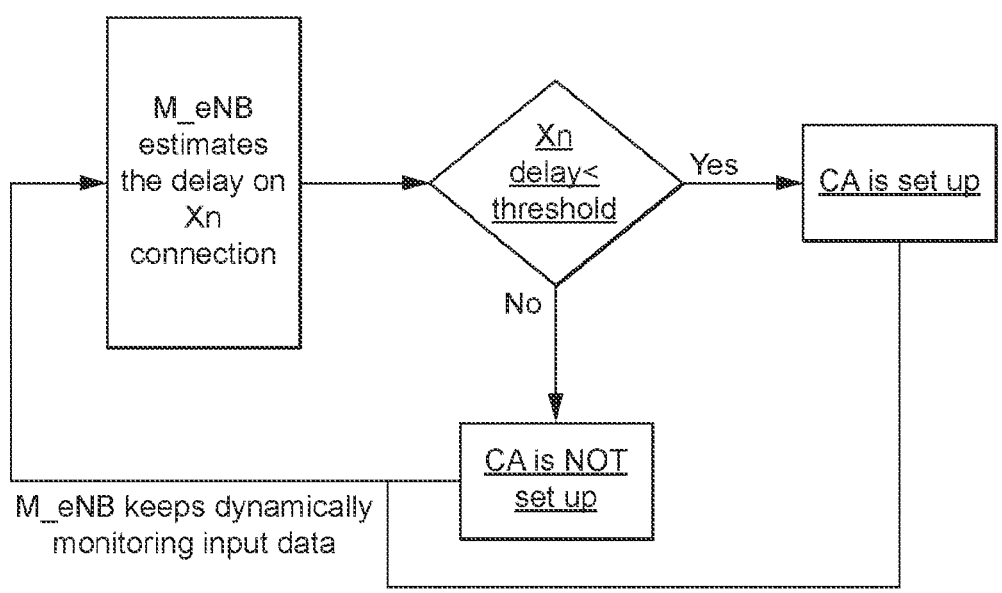
FIG. 4 depicts an example flow chart for deciding whether to implement inter-eNB carrier aggregation based on a first variable shown in FIG. 3.

A first parameter for consideration is QoS, specifically latency. Referring next to FIG. 4, there is depicted an example flow chart for deciding whether to implement inter-eNB carrier aggregation based on this variable. The threshold is typically a fixed or static value set by the network at the Operations Support System (OSS) for example and applies throughout the whole network when inter-site carrier aggregation is possible.

In a small cell scenario the architecture of the network may imply a non-ideal backhaul (such as a non-fibre backhaul) particularly for the Xn interface. This may add certain latency into the transmissions affecting the real user performance. This may consequentially require buffering of a considerable amount of information. In this case, configuring carrier aggregation may not be optimum, irrespective of the radio conditions.

More generally, the at least one parameter associated with the performance of the cellular network may comprise an indication of latency for communication between network entities of the cellular network (for example between the first and second base stations). Then, the method may further comprise deciding to activate carrier aggregation if the indication of latency is less than a threshold value.

Figure 5:
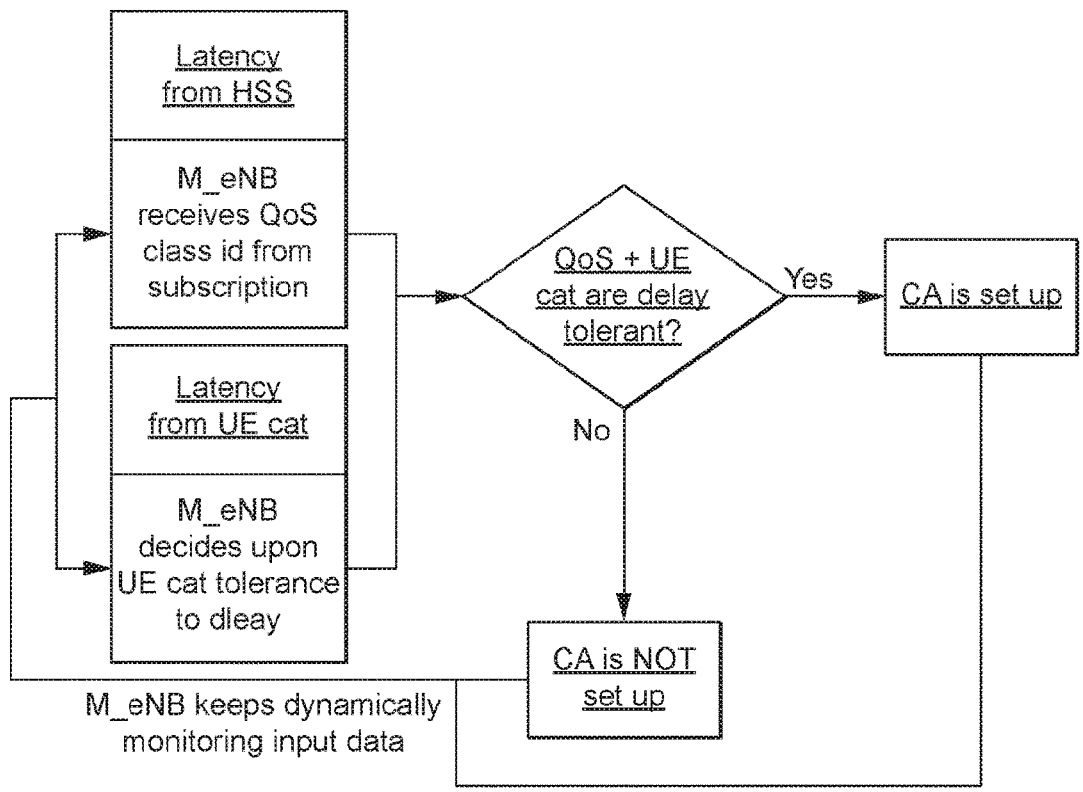
FIG. 5 depicts an example flow chart for deciding whether to implement inter-eNB carrier aggregation based on a second variable shown in FIG. 3.

Another parameter for consideration relates to the QoS of the service being provided, especially latency. Referring next to FIG. 5, there is depicted an example flow chart for deciding whether to implement inter-eNB carrier aggregation based on this variable. There may be services that require low latency. Carrier aggregation may be deactivated to provider lower latency and better customer experience for such services. Such services can for example comprise telemetry, radio control (such as drones), remote surgery. The QoS requirements may include at times high throughput and low latency. At other times, carrier aggregation may already be configured for some purposes (such as sending video streams) while low latency is not key. Then, carrier aggregation is deactivated if the device needs to perform a task in real time or the network asks for deactivation.

These type of services, or dedicated devices shall avoid configuring carrier aggregation when latency may be impacted. These devices can be identified by the eNB based on subscription data from the HSS through MME nodes, or through a UE category signalled (in an as yet undefined way) by the UE to the eNB. Such a UE category already exists (for example for machine-to-machine type UEs) but is not used for the purposes to identify UEs for low latency.

The tolerance to delay (or intolerance) is normally based on the combined information from the subscription and UE category, which may be related. If the UE is non-delay tolerant (for example surgery equipment, or drone device) but all data associated with it is delay-tolerant, the MeNB may decide to set up carrier aggregation. If there is part of the data that is non-delay tolerant, for instance associated to tele-commands that must be executed in real time, then the MeNB will deactivate carrier aggregation.

This can more generally be understood as when the at least one parameter associated with the Quality of Service requirement of the service comprises one or more of: a latency requirement of the service; and a minimum bit rate requirement of the service. The latency requirement of the service may (in part or entirely) be determined by a latency requirement associated with the mobile terminal (UE). The method optionally further comprises: deciding to activate carrier aggregation if the latency requirement of the service is at least a threshold delay tolerance level. Additionally or alternatively, the method may further comprise: deciding to deactivate carrier aggregation if the latency requirement of the service is less than a threshold delay tolerance level (which may be the same or different to the activation threshold noted above).

Further parameters for consideration may relate to a state of the subscriber and/or mobile terminal. In general terms, the at least one parameter associated with a state of the mobile terminal may comprise one or more of: a mobility state; a quality of service state; a battery state; and a transmission power back-off state. One quality of service state of the mobile terminal may relate to service latency requirements, as discussed above.

Figure 6:
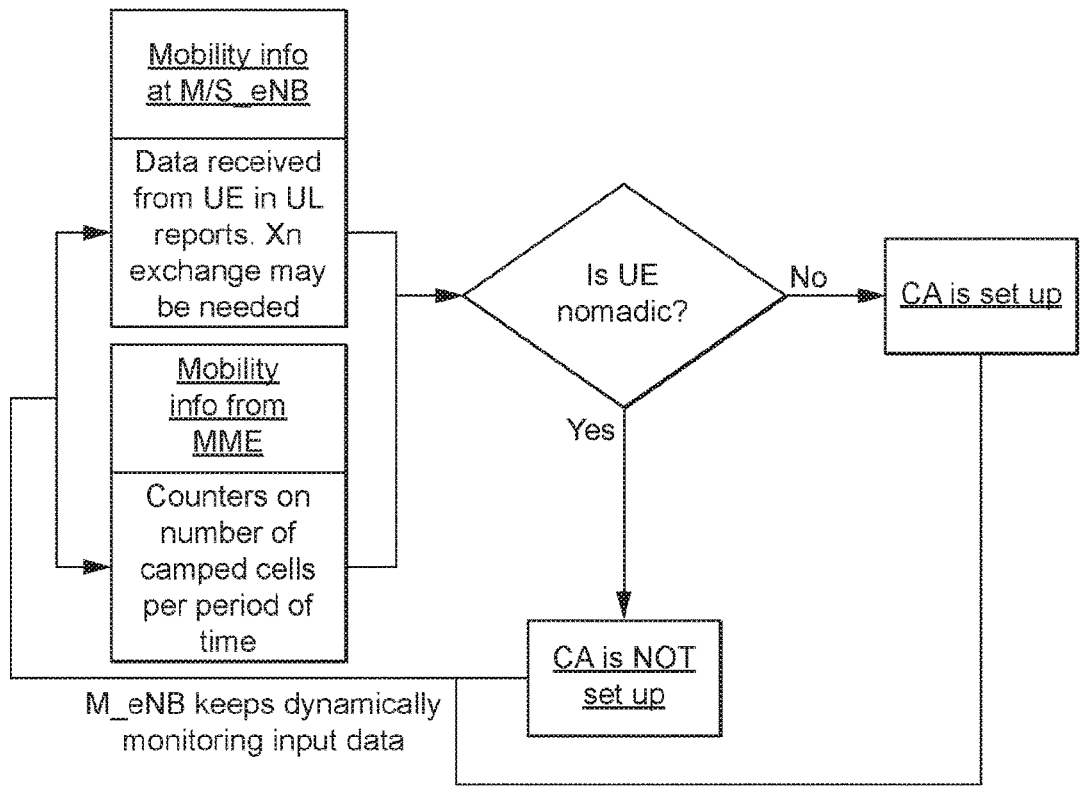
FIG. 6 depicts an example flow chart for deciding whether to implement inter-eNB carrier aggregation based on a third variable shown in FIG. 3.

Another particular mobile terminal QoS parameter of interest may relate to its mobility (that is, whether and how it is moving within the network). Referring now to FIG. 6, there is depicted an example flow chart for deciding whether to implement inter-eNB carrier aggregation based on this parameter.

If a UE is not fast-moving, it may be optimum to configure a Scell for it. The use of carrier aggregation in small cell scenario ensures that UEs typically remain connected to the macro cell along its path when moving across small cells. In this way, a UE will minimize service disruption and will configure a Scell along its movement.

However, it may also be true that situations where this handling of UEs may not be optimum. For example, a UE camping in the macro network may move sufficiently fast so that carrier aggregation configuration and reconfiguration may not be optimum. In these cases, the optimum behaviour may be to limit the UE to single carrier (macro cell) operation. This may avoid the configuration and reconfiguration mechanisms, saving battery, overload in the network and providing a smoother experience.

There are multiple ways to identify these users, which may comprise: Doppler information from uplink signal; counter of small cells camped in a certain period of time; connection time in a given small cell; location information, for example from a Global Navigation Satellite System (GNSS), such as GPS, Galileo, BeiDou or similar.

As indicated above, there are several sources of information regarding the mobility of a given UE and those can be combined at the MeNB (or other network entity) to take an informed decision on the nomadism characteristics of a given UE. If that nomadism value is over a threshold, carrier aggregation will not be configured. This threshold value can be computed as a weighted summation of: a) Doppler data (and related speed), b) GPS data (and related speed) if available; and c) a counter of small cells per specified time period (for instance 5 minutes). This can be expressed as:

Mobility_*thr*=weighted_Σ{avg(speed from Doppler in UL reports from UE,speed from GPS),# small_cells/*X*min}

More generally, it may be understood that the parameter associated with a mobility state is advantageously based on one or more of: Doppler information from a mobile terminal transmission (received at the first base station and/or second base station); a rate of handover between base stations for the mobile terminal; a time duration of attachment of the mobile terminal to a base station; and a location for the mobile terminal (for example by a GNSS). The quality of service state for the mobile terminal optionally indicates a maximum delay tolerance for the mobile terminal. Then, the method may further comprise deciding to activate carrier aggregation if the maximum delay tolerance for the mobile terminal is at least a threshold delay tolerance level. Additionally or alternatively, the method may comprise deciding to deactivate carrier aggregation if the maximum delay tolerance for the mobile terminal is less than a threshold delay tolerance level (which may be the same or different to the activation threshold). In some embodiments, the parameter associated with a mobility state indicates whether the mobile terminal is nomadic. In this case, the method may further comprise deciding to activate carrier aggregation if the mobile terminal is indicated to be nomadic.

Overheads are a further parameter for consideration. Implementing carrier aggregations causes increased overheads, particularly in terms of RRC reconfigurations. In some cases, the additional quantity of overheads due to carrier aggregation may impact significantly on the additional available throughput that may be achieved as a consequence. In other words, configuring a Scell may not be optimum due to the overheads that CA requires, from a service point of view. In such cases, it is expected that single carrier operation will provide a better experience. Overheads for carrier aggregation in a small cell deployment may be (significantly) larger than for an intra-eNB carrier aggregation scenario.

Figure 7:
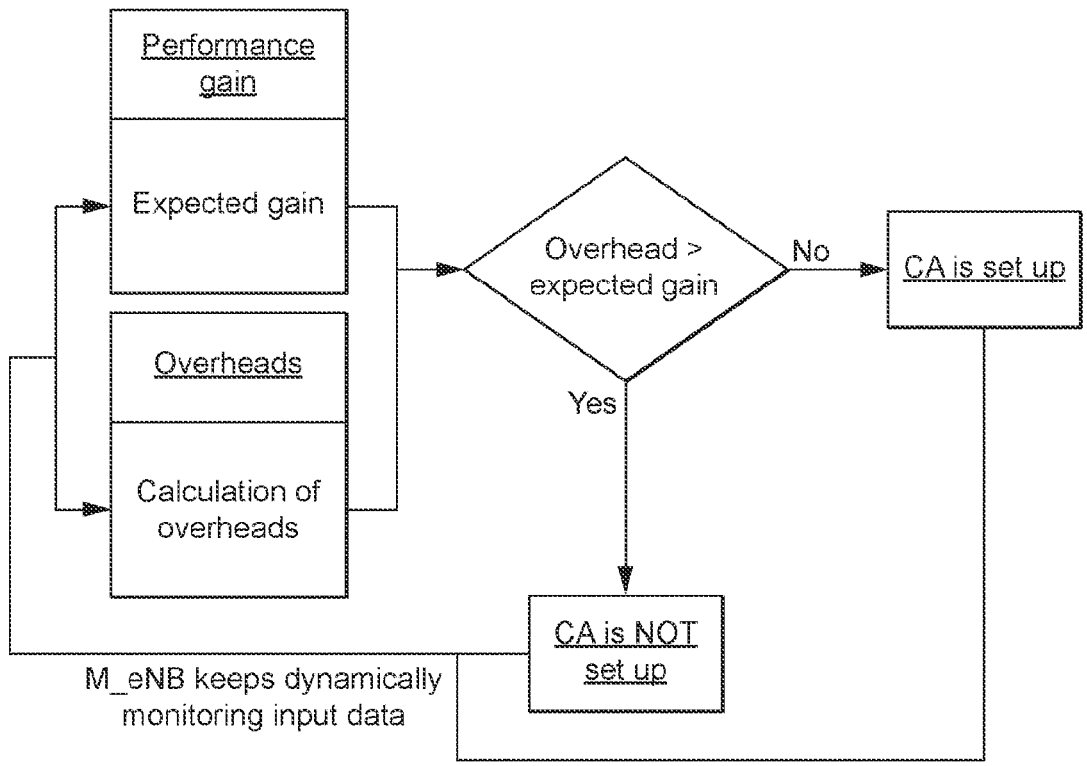
FIG. 7 depicts an example flow chart for deciding whether to implement inter-eNB carrier aggregation based on a fourth variable shown in FIG. 3.

Referring now to FIG. 7, there is depicted an example flow chart for deciding whether to implement inter-eNB carrier aggregation in view of this parameter. One possible measure of the overheads may use the number of RRC reconfigurations. For carrier aggregation, RRC reconfigurations will consist primarily of secondary cell addition, removal and change. In contrast with a mobility parameter, as noted above, the number of RRC reconfigurations may relate to the network configuration and not only the movement of the UE. A threshold for the maximum number of RRC reconfigurations could be applied. This could be based on either the measured number of RRC reconfigurations, or an approach to predict the number of RRC reconfigurations could be used.

More generally, the at least one parameter associated with a performance of the cellular network may comprise a parameter based on an assessment of a change in throughput due to carrier aggregation activation relative to a change in transmission overheads due to carrier aggregation activation. Then, the method may further comprise deciding to activate carrier aggregation if the assessment indicates an increase in throughput due to carrier aggregation activation relative to a change in transmission overheads due to carrier aggregation activation. This may be in comparison to the throughput when carrier aggregation is not activated. Additionally or alternatively, the method may further comprise deciding to deactivate carrier aggregation if the assessment indicates an increase throughput due to carrier aggregation activation when compared to a change in transmission overheads due to carrier aggregation activation is less than a threshold value.

Carrier aggregation may have significant power requirements, which may be disadvantageous for a battery-powered mobile terminal. Hence, it may not be desirable to activate carrier aggregation from the user perspective, if the remaining battery resource is limited. The decision to activate or deactivate carrier aggregation would then be made (at least in part) by the mobile terminal, unless this information is fed back to the network. In principle, this information is not available to the network, but such information may optionally be provided for it to be used by the network in making a centralized decision.

Figure 8:
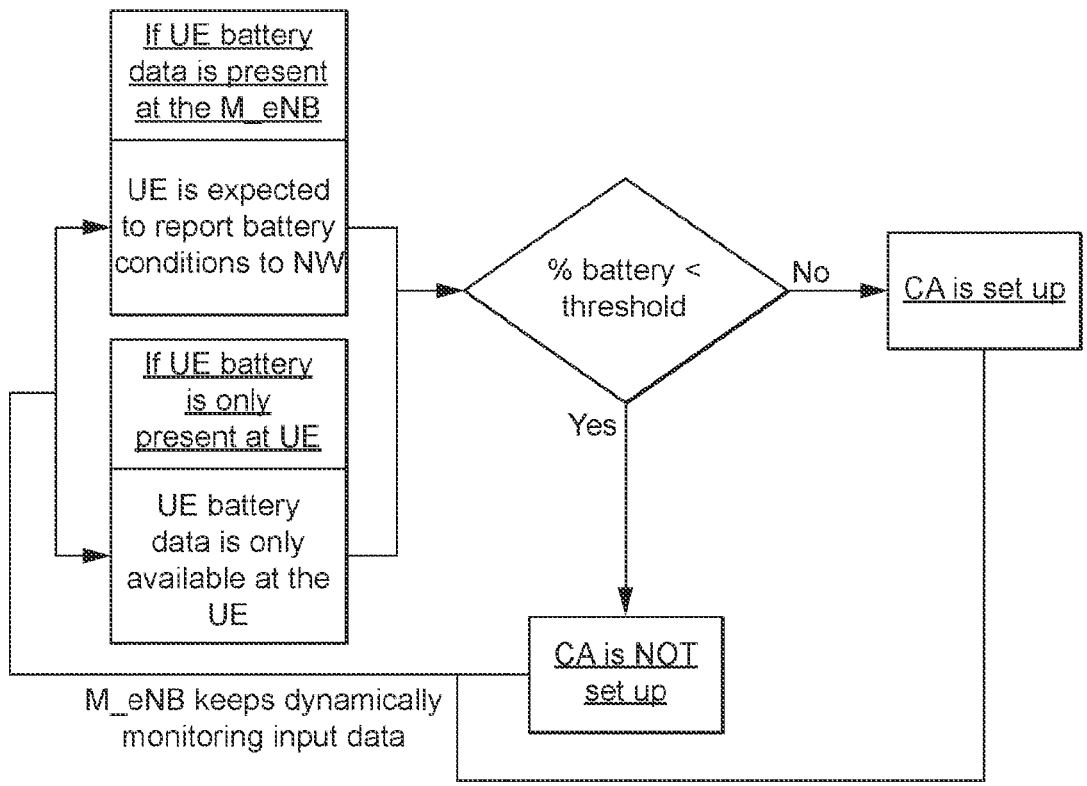
FIG. 8 depicts an example flow chart for deciding whether to implement inter-eNB carrier aggregation based on a fifth variable shown in FIG. 3.

Referring now to FIG. 8, there is depicted an example flow chart for deciding whether to implement inter-eNB carrier aggregation based on this parameter. It will be seen that this flow chart considers two options:

1) the UE proactively reports the remaining battery capacity to the network; and
2) the UE does not report UE battery capacity data.

In option 1), the network can proactively take an informed decision and not activate carrier aggregation for a given UE, if the battery level remaining is below a given threshold. This threshold is preferably static and may be around 10% for example. In option 2), the UE does not report any data to the network, so the decision of setting carrier aggregation or not is ratified by the UE, ultimately based on the battery conditions. In this case, we assume that the UE is mandated to indicate this reason to the network (for instance, in the appropriate RRC signalling message).

In a general sense, the method may further comprise receiving the parameter associated with the battery state at the cellular network from the mobile terminal. Then, the method may further comprise deciding to activate carrier aggregation if the parameter associated with the battery state indicates that the battery power level is at least a first threshold level and/or deciding not to activate carrier aggregation if the parameter associated with the battery state indicates that the battery power level is less than a second threshold level. The first threshold level may be the same as the second threshold level or they may be different (for instance, the second threshold level may be higher or lower than the first threshold level).

Figure 9:
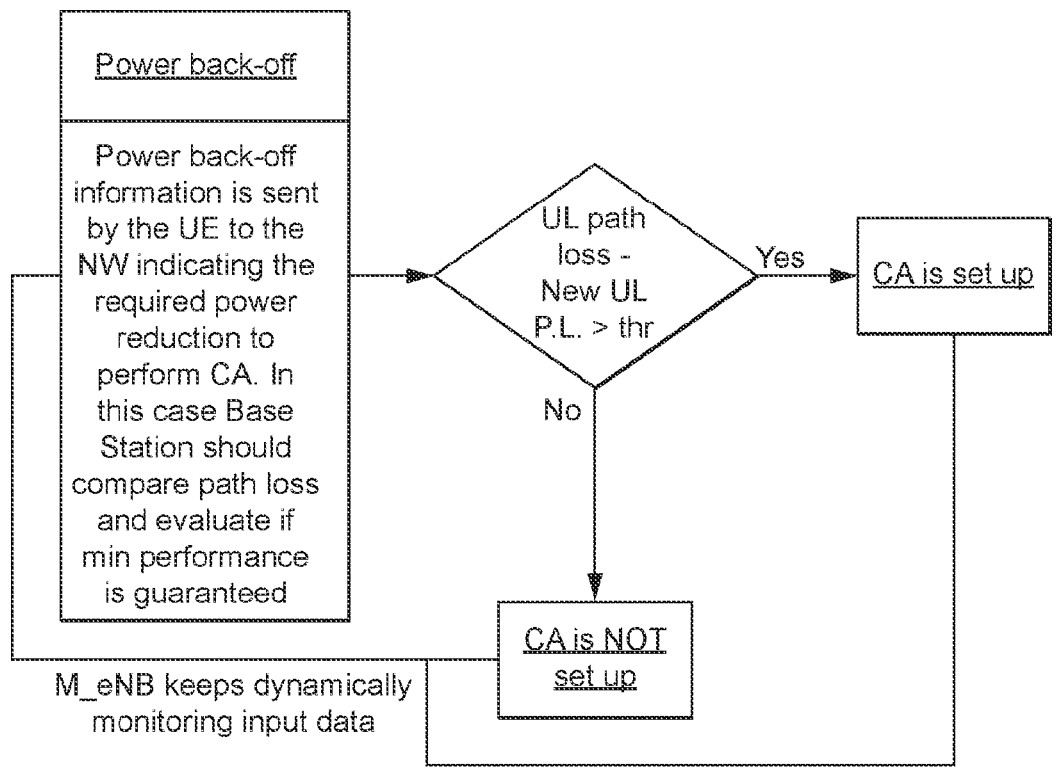
FIG. 9 depicts an example flow chart for deciding whether to implement inter-eNB carrier aggregation based on a sixth variable shown in FIG. 3.

In some scenarios where carrier aggregation is performed across specific frequency bands, certain restrictions in terms of transmission power may apply. In such cases (especially where the different bands belong to different network entities), the impact of power back-off may be larger due to the physical separation of the eNBs. In this case it is expected that a minimum carrier aggregation performance may be ensured by 3GPP protocols (3GPP TS 36.321 MAC protocol and 3GPP TS 36.101 UE RF requirements), so that it is possible to avoid carrier aggregation when the radio conditions shaped by the power back-off do not result in optimum performance. However, further flexibility may be provided at the scheduler, so that it is left for the network to decide if power back-off or its level is allowed or not, so that observed performance is not degraded. Referring to FIG. 9, there is depicted an example flow chart for deciding whether to implement inter-eNB carrier aggregation based on this variable.

The MeNB receives the required power back-off from UE and calculates an uplink path loss (that is, a coverage reduction). The MeNB can then compare this coverage reduction to a static or configurable value which can depend on other inputs. These other inputs may depend on what other bands are present. If another carrier aggregation configuration across other bands may not result in unreasonable power back-off, then the MeNB will schedule the UE on that new configuration.

More generally, the transmission power back-off state may indicate a transmission power back-off associated with carrier aggregation activation. Then, the method may further comprise assessing a throughput parameter for carrier aggregation activation based on the indicated transmission power back-off. The method may further comprise deciding to activate carrier aggregation if the assessed throughput parameter is at least a threshold level.

Each of the criteria discussed above may be considered individually, but a combination of these criteria is preferably considered, as indicated by FIG. 3. In particular, it is not necessary for all criteria to be met to activate carrier aggregation. For example, a threshold could be applied on the number of criteria that are met, for example at least three out of five criteria need to be met to activate carrier aggregation. Additionally or alternatively, some criteria could be prioritised over others. For instance, carrier aggregation is not used if the latency requirements are not met, independently of all other criteria. As another alternative, a weighted measure of the criteria could be used. For example, the weighted sum of the ratios of each criterion to its threshold value could be used, as indicated by the formula (where $w_1$, $w_2$, $w_3$, etc represent weight values):

$$\text{weighted\_metric} = w_1 * (\text{latency\_actual}/\text{latency\_threshold}) + w_2 * (\text{overhead\_actual}/\text{overhead\_threshold}) + w_3 * (\ldots) \text{ etc.}$$

An alternative formula may replace each of the ratios by a 1 if the criteria meets the respective threshold and by a 0 if not. In any of these approaches, carrier aggregation is then not activated if the weighted metric is at least a threshold level.

In general terms, the step of deciding on the activation of carrier aggregation may be based on a weighted measure of a plurality of the parameters. In particular, the step of deciding may comprise deciding to activate carrier aggregation if the weighted measure is at least a threshold. Alternatively (or possibly in combination with another approach), the step of deciding may comprise deciding to activate carrier aggregation if one or more specific parameters from the plurality of parameters Any combination of specific features may be provided from any of the aspects discussed above, even if that combination is not explicitly disclosed. Moreover, any part or combination of parts of this aspect may be combined with any other aspect discussed herein.

Carrier Aggregation Mode Selection

Figure 1:
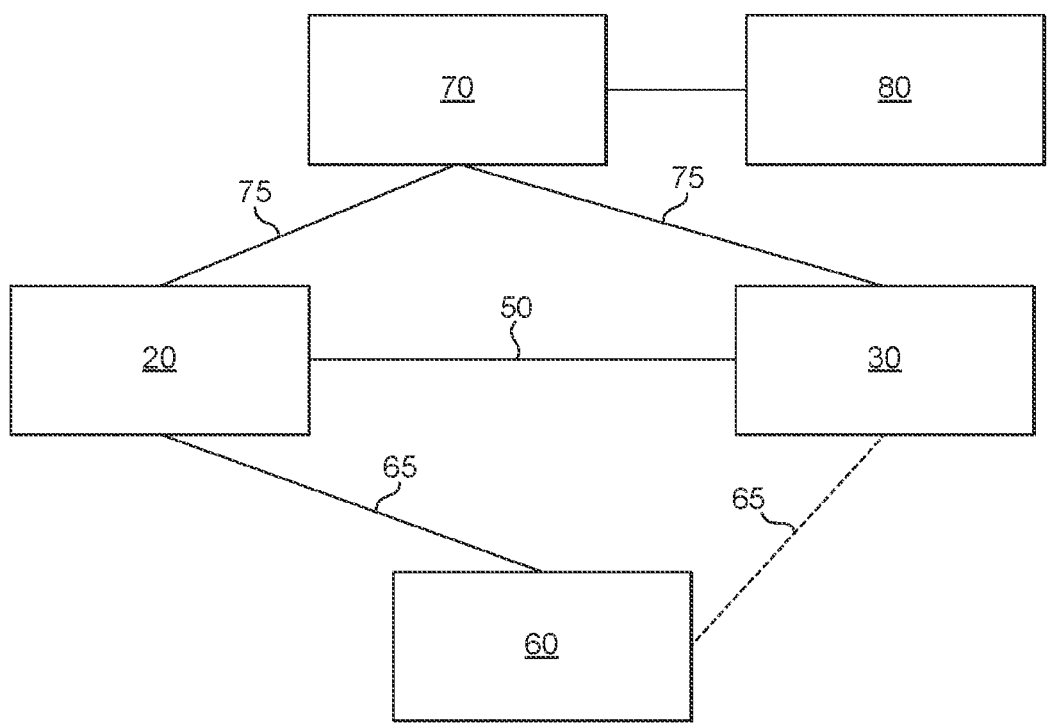
FIG. 1 shows a schematic diagram of a part of a network architecture to permit inter-eNB carrier aggregation.
Figure 2A:
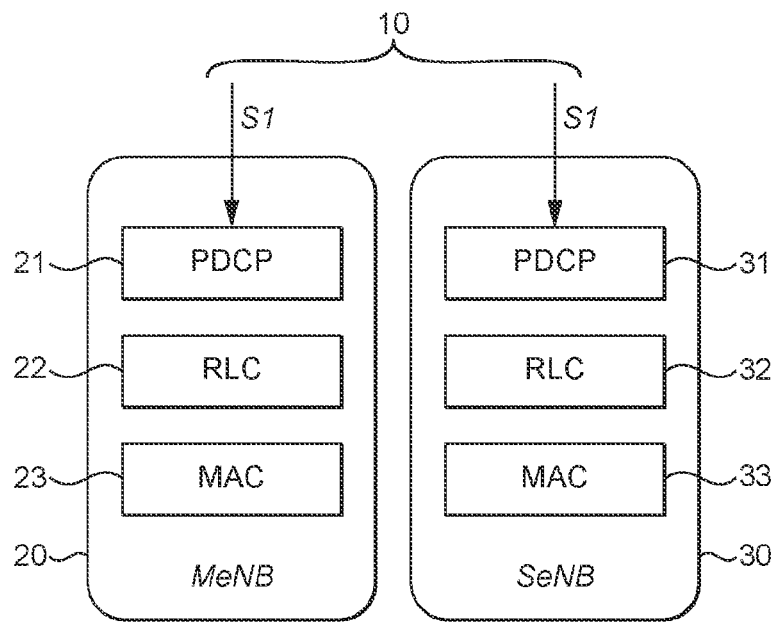
FIGS. 2A and 2B illustrate techniques for implementing inter-eNB carrier aggregation based on the network architecture shown in FIG. 1.
Figure 2B:
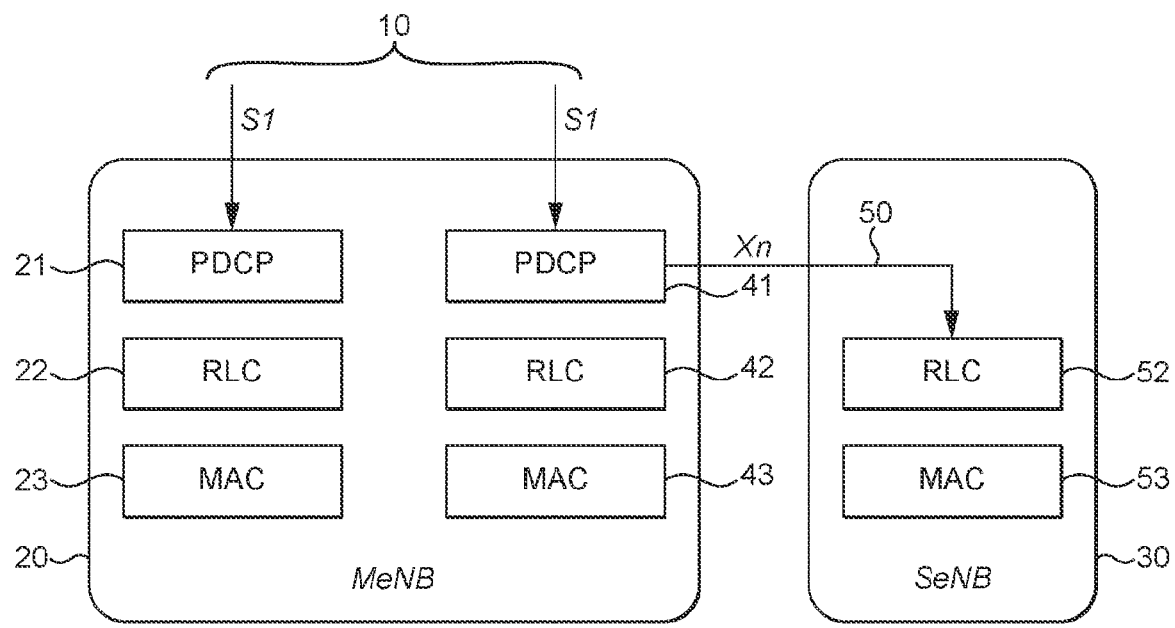

The techniques for implementing inter-eNB carrier aggregation that have been standardised by 3GPP have been discussed above with reference to FIGS. 2A and 2B. The architecture shown in FIG. 2A will be referenced as Architecture 1A below and the architecture shown in FIG. 2B will be referenced as Architecture 3C below, for the sake of convenience.

It should be noted that Architecture 1A essentially uses both base stations as separate cells, with an S1 interface terminating at the SeNB. In contrast, Architecture 3C facilitates a split of the bearers across both eNBs with the S1 interface terminating in the MeNB. It therefore relies on a close connection between the macro base station and small base station (although this may be generalised to any two base stations).

Moreover, it is further observed that Architecture 1A may only be useful in a scenario where the service is provided with at least two different bearers. Architecture 3C may require a flow control mechanism to determine which data should be transmitted by the MeNB and which should be transmitted by the SeNB. In addition, to enable optimised scheduling decisions, some coordination may be required between the scheduler in the MeNB and SeNB. The process of sending data over the Xn interface (flow control) introduces additional latency, and some services can be affected by this.

Both architectures have advantages and disadvantages. The optimal choice of architecture may depend on a number of factors. It has been assumed that only architecture will be implemented by a network operator. However, a more beneficial approach is considered to enable both architectures and to implement a mechanism for dynamically selecting the best architecture. Both architectures would be supported in the network and the UE. Switching between the architectures need not be highly dynamic. Most likely, the architecture would be chosen at call establishment, and then only change if different services are used.

In general terms, this can be understood as a method for selecting a mode of service delivery to a mobile terminal using carrier aggregation across first and second base stations of a cellular network. This may include set up at initialization and/or dynamic reconfiguration. Preferably, the selecting is based on one or more of: a parameter of the service; and a parameter of the network architecture. The first and second base stations are preferably configured for use within a Long Term Evolution network architecture. In particular embodiments, the selecting may be from a set of modes comprising: a first mode, in which the first base station uses a first carrier to deliver a first bearer of the service to the mobile terminal and the second base station uses a second carrier to deliver a second bearer of the service to the mobile terminal; and a second mode, in which the first base station uses a first carrier to deliver a first portion of a bearer of the service to the mobile terminal and the second base station uses a second carrier to deliver a second portion of the bearer of the service to the mobile terminal. In both modes, there may be more than one or two bearers. The modes only relate to the division of at least one bearer between the base stations. Other modes may be possible.

In particular, the selection may advantageously be based on one or more of the following criteria:
- latency requirements of service (if the service being used requires low latency, then architecture 1A may be a better choice than 3C);
- number of bearers used by the UE (Architecture 1A may have the most benefit when two different bearers are used, as both bearers can be transmitted over different cells); and
- Performance of network links (for architecture 3C, data to and from the small cell will be transmitted over the Xn interface, whereas for 1A it will go over the S1 interface between the small cell and the core network; if these interfaces are physically separate and/or independent and one of them is congested, while the other one is not, then it makes sense to use the uncongested interface).

Figure 10:
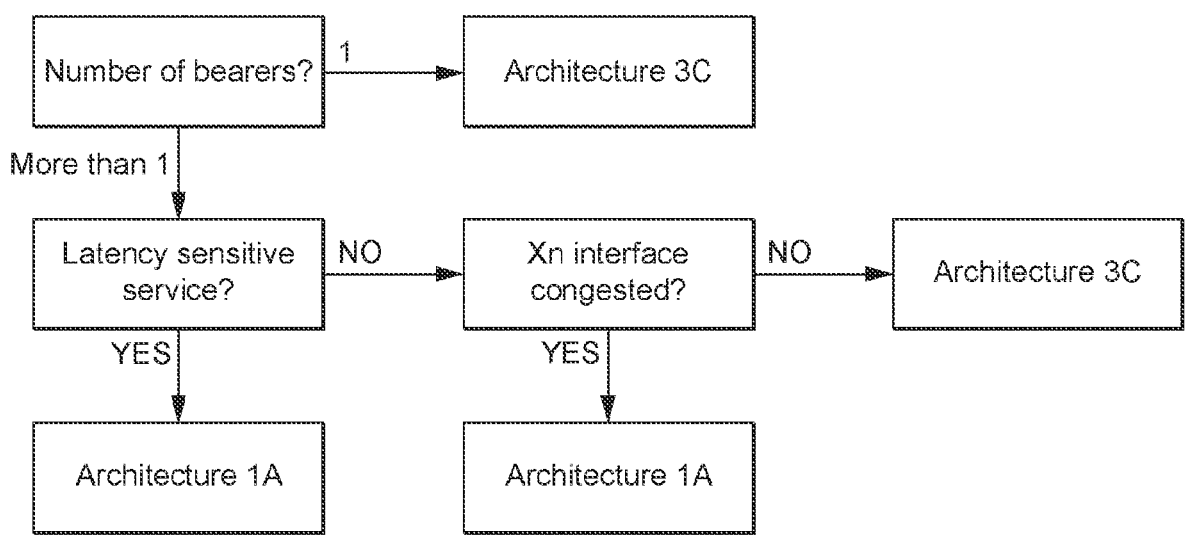
FIG. 10 illustrates a flow chart for selecting a technique for implementing inter-eNB carrier aggregation, in accordance with a second embodiment.

Referring now to FIG. 10, there is illustrated a flow chart for selecting a technique for implementing inter-eNB carrier aggregation. This decision making process is based on the criteria noted above.

More generally, the parameter of the service may comprise a number of bearers of the service. Then, the step of selecting advantageously comprises selecting the second mode (that is, Architecture 3C) when the service consists of (that is, only has) one bearer. If there are multiple bearers, then the first or second modes can be employed.

In some embodiments, the parameter of the service comprises a quality of service requirement, for example indicating a maximum delay tolerance of the service. Then, the step of selecting may comprise selecting the first mode when the maximum delay tolerance of the service is less than a threshold level. Preferably, the step of selecting comprises: selecting on the basis on the number of bearers of the service; and subsequently selecting on the basis of the quality of service requirement. Thus, the selection based on the quality of service requirement may typically be performed dependent on the result of the selection based on the number of bearers of the service.

In the preferred embodiment, the parameter of the network architecture comprises an indication of congestion across at least one interface of the network architecture, for example an interface between the first and second base stations (such as the Xn interface) and/or an interface between the first and/or second base station and another network entity (such as the MME, through the S1 interface). Then, the step of selecting may comprise selecting the first mode when the indication of congestion is at least a threshold level. Additionally or alternatively, the step of selecting may comprise selecting the second mode when the indication of congestion is less than the threshold level. Optionally, the step of selecting comprises: selecting on the basis of the quality of service requirement; and subsequently selecting on the basis of the indication of congestion. Thus, the selection based on the indication of congestion may typically be performed dependent on the result of the selection based on the quality of service requirement. In some embodiments, the selection based on the indication of congestion may typically be performed subsequently to (and optionally based on) the selection based on the number of bearers of the service.

The method may be implemented by means of a computer program, which will cause the steps to be carried out when operated by a processor (or other logic). The computer program may be stored on a computer readable medium. In another aspect, there may be provided a network entity of a cellular network, configured to select a mode of service delivery to a mobile terminal using carrier aggregation across first and second base stations of the cellular network in accordance with the method as described herein. The network entity may have structural features (such as respective components, modules or parts) configured to provide the functionality associated with any of the steps discussed herein. The network entity is optionally the first or second base station, the mobile terminal, part of another known network entity or a new network entity.

Any combination of specific features may be provided from any of the aspects discussed above, even if that combination is not explicitly disclosed. Moreover, any part or combination of parts of this aspect may be combined with any other aspect discussed herein.

Resource Allocation for Carrier Aggregation

Intra-eNB carrier aggregation assumes a single entity or scheduler that is located in a Baseband Unit (BBU) at the Base Station that can handle the multiple carriers being aggregated. However, this is not possible for inter-eNB carrier aggregation, since each base station is likely to have its own scheduler and/or BBU.

Different equipment manufacturers (vendors) use different forms of resource allocation, in the form of scheduling and flow control algorithms, in their eNBs. Consider a UE supporting inter-eNB carrier aggregation (which will be referred to here as a "Rel-12" UE, inter-eNB carrier aggregation being standardised in 3GPP LTE Release 12, as opposed to a "Rel-8" UE that does not support carrier aggregation) and connected to two different eNBs on two different component carriers. A 'Rel-8' UE is a UE that does not support carrier aggregation, but any pre-Rel-12 UE will not support inter-eNB carrier aggregation. If the two eNBs are from the same vendor, then they would normally use the same scheduling algorithm or at least have a high degree of collaboration between their schedulers. However, if the two eNBs are from different vendors then there is a risk of highly inefficient data scheduling to the UE performing inter-eNB carrier aggregation for a number of reasons.

1. The two eNBs will normally have different scheduling algorithms, which would be optimizing different functions. In an extreme case, one scheduler algorithm might use a "round-robin" algorithm that guarantees an equal share of the resources to the UEs disregarding channel conditions while the other scheduler may use a "max C/I" algorithm that tries to give most of the resources to UEs that have the best channel conditions. This would result in a non-efficient or non-optimal scheduling for the Rel12-UEs since they are scheduled with two different scheduling algorithms on the two carriers of the two eNBs.

2. Some fairness should be guaranteed between Rel-8 UEs and Rel-12 UEs. Assuming a Rel-8 UE with access to only one carrier has the same chance to be scheduled as a Rel-12 UE having access to N aggregated carriers. Then, the Rel-12 UE would get N times the resources of those allocated to the Rel-8 UE. Remedying this imbalance may involve the exchange of some information between the eNBs about the resources used by Rel-12 UEs on each carrier to guarantee some fairness to Rel-8 UEs. This problem could exist in eNBs from the same vendor, but it could be more severe in a multi-vendor scenario.

It is proposed to have a mechanism for resource allocation, particularly in the form of flow control and scheduling, for base stations to solve the above mentioned issues, for example. In general terms, this can be understood as a method for managing service delivery to at least one mobile terminal using carrier aggregation across first and second base stations of a cellular network. For example, this may be achieved by management of resources and/or data in connection with the second base station.

The method may comprise determining, at a network entity of the cellular network (preferably distinct from the second base station), a data transmission configuration in respect of the second base station. In particular, this data transmission configuration is preferably based on one or more of: a characteristic of service data for transmission to the at least one mobile terminal; a parameter of an interface between the first and second base stations; a characteristic of the second base station; and a state of a radio interface between the second base station and the at least one mobile terminal. A data transmission configuration (which may be a form of resource allocation or management) may comprise one or both of: a configuration of an interface between the network entity (or the first base station) and the second base station; and a configuration of an interface between the second base station and the mobile terminal. The management may be in terms of data quantity and/or rate, data allocation, physical/radio resource allocation or a combination of these parameters. Optionally, the method further comprises receiving information about the service data at the network entity.

The method may comprise allocating, at a network entity of the cellular network (preferably distinct from the second base station), at least some service data for transmission by the second base station. In particular, the service data is preferably allocated based on: a latency of an interface between the network entity and second base stations; and a latency tolerance of the service data.

Preferably, no service data is allocated for transmission by the second base station if a transmission buffer state for the second base station is at least a threshold level.

The method may also include: receiving the service data at the network entity; and communicating at least some of the service data from the network entity to the second base station based on the determined allocation.

The method may comprise determining, at a network entity of the cellular network (preferably distinct from the second base station), a data transmission configuration in respect of the second base station. In particular, this data transmission configuration is preferably based on: an indication of an amount of data and/or resources for transmission to mobile terminals without carrier aggregation functionality being served by the second base station; and an indication of an amount of data and/or resources for transmission to mobile terminals with carrier aggregation functionality being served by the first base station.

Preferably, the step of determining comprises identifying an amount of data and/or resources for transmission by the second base station to the at least one mobile terminal.

Preferably, the step of identifying an amount of data and/or resources for transmission by the second base station to the at least one mobile terminal is performed such that the second base station has capacity to transmit data to mobile terminals without carrier aggregation functionality being served by the second base station.

Preferably, the step of determining is further based on one or more of: a characteristic of service data for transmission to the at least one mobile terminal at a network entity of the cellular network; a parameter of an interface between the first and second base stations; a characteristic of the second base station; and a state of a radio interface between the second base station and the at least one mobile terminal.

Preferably, the steps of allocating and determining are carried out at the same network entity.

Preferably, the network entity is the first base station (a master and/or macro base station, as opposed to the second base station that is typically secondary and/or small). Optionally, the step of determining comprises identifying an amount of data for transmission by the second base station to the at least one mobile terminal. Specific details of the implementation will be discussed below, first with regard to flow control (especially with reference to architecture 3C that was noted above) and then in respect of scheduling.

Figure 11:
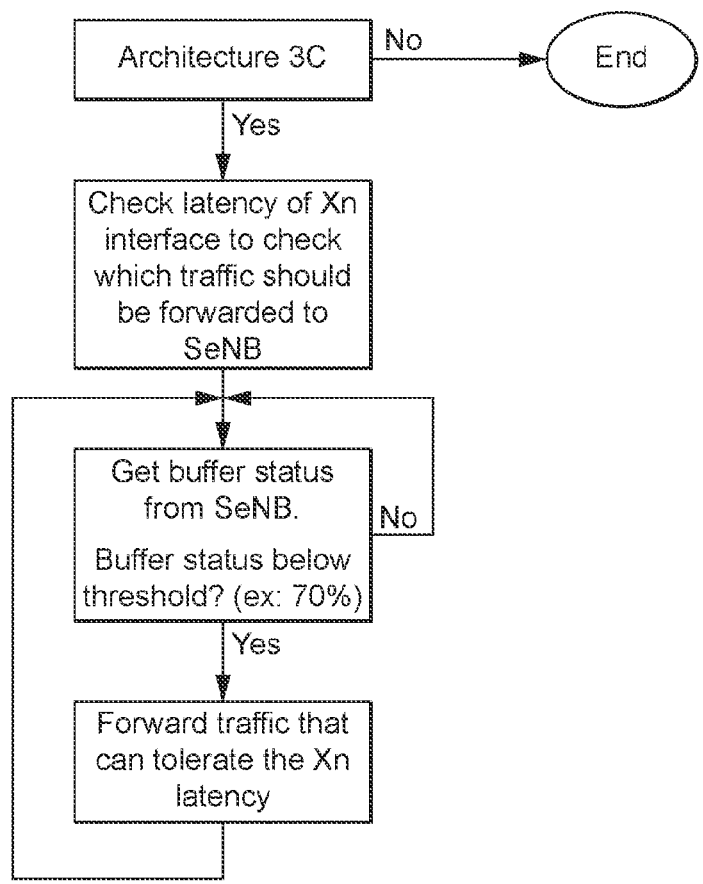
FIG. 11 shows a flow chart for flow control of inter-eNB carrier aggregation data traffic, in accordance with a third embodiment.

Referring next to FIG. 11, there is shown a flow chart for flow control of inter-eNB carrier aggregation data traffic. Flow control is not a specific problem for architecture 1A, so this need not be implemented unless architecture 3C is selected. For flow control, a number of parameters are considered: latency of the network interfaces (especially the Xn interface); buffer status of the SeNB; and delay tolerance of the traffic. These will now be considered.

In general terms, the step of determining a resource allocation for the second base station may comprise determining an allocation of resources for transfer between the network entity and the second base station. This may be termed flow control.

The MeNB is made aware of the Xn interface latency to decide which type of data to be sent to the SeNB. If the latency of Xn interface is high, the MeNB would tend to forward delay tolerant data only to the SeNB whereas if the latency is low the MeNB could decide to forward some non-delay tolerant data. Nonetheless, the priority would be for the MeNB to transmit such type of data.

More generally, the parameter of an interface between the first and second base stations may comprise a latency of the interface. Then, the step of determining may comprise allocating at least some of the service data for transmission by the second base station based on the latency of the interface. Additionally or alternatively, the characteristic of the service data may comprise a latency tolerance. Then, the step of determining may comprise allocating at least some of the service data for transmission by the second base station based on the latency tolerance of the service data.

Flow control may be improved by the SeNB sending its buffer status to the MeNB. The MeNB would decide how much data it should forward the SeNB. This may prevent the SeNB buffer to be overloaded and also reduces the time needed by SeNB to request new data from the MeNB after its buffer is emptied.

In general terms, the characteristic of the second base station may comprise a transmission buffer state. Then, the step of determining may comprise allocating no service data for transmission by the second base station (which may be understood as communicating no service data over an interface between the network entity and the second base station) if the transmission buffer state is at least a threshold level. Conversely, the method may comprise allocating at least some service data for transmission by the second base station if the transmission buffer state is less than the threshold level.

Another aspect of resource allocation concerns scheduling. In general terms, the step of determining a resource allocation for the second base station may comprise determining an allocation of resources for transmission of service data by the second base station. This may be termed scheduling.

More specifically, the step of determining may comprise identifying an amount of data for transmission by the second base station to the mobile terminal.

Figure 12:
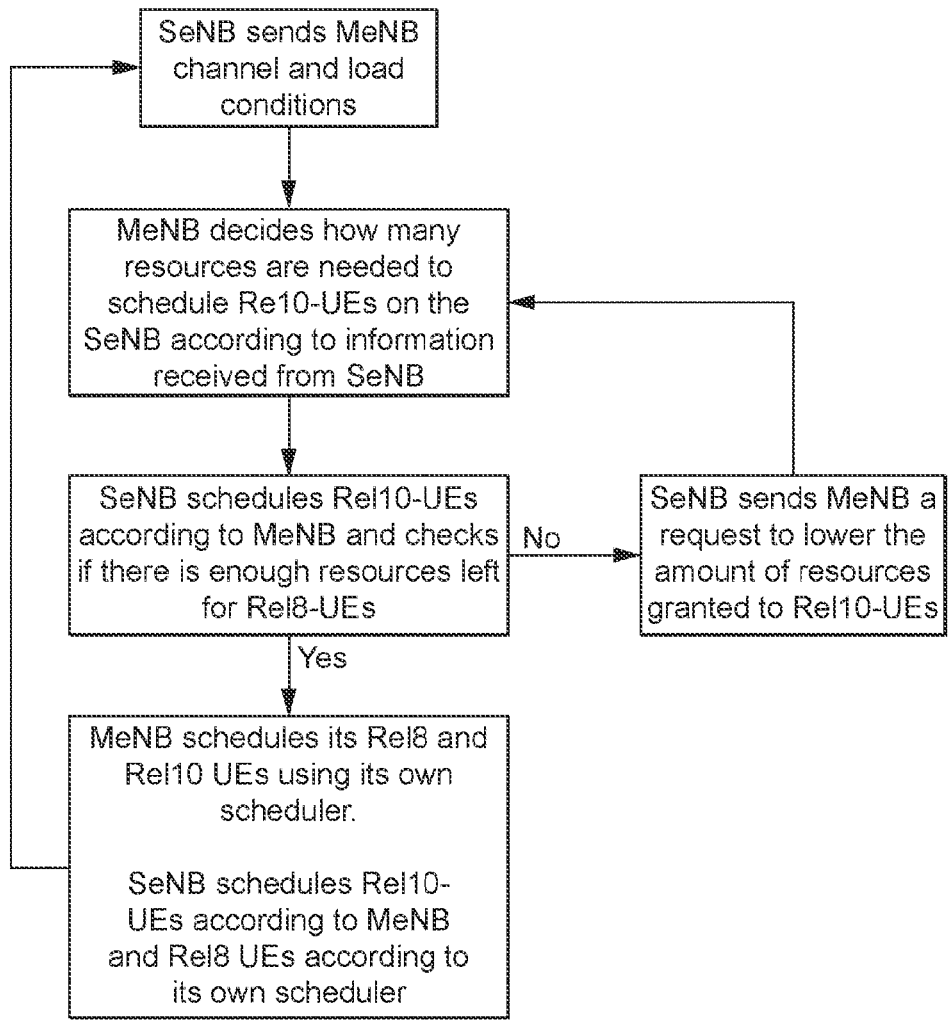
FIG. 12 shows a flow chart for configuring scheduling for inter-eNB carrier aggregation data traffic, in accordance with a fourth embodiment.

Referring next to FIG. 12, there is shown a flow chart for configuring scheduling for inter-eNB carrier aggregation data traffic. For scheduling, two approaches are proposed.

1. The eNBs involved in inter-eNB carrier aggregation may both fall back to a generic or simple, but efficient scheduling algorithm like the proportional fair scheduler where minimal information is exchanged between the eNBs like the past throughput of Rel-12 UEs, simply to provide fairness to Rel-8 UEs.

2. An alternative approach is for the MeNB (or other network entity) to take full control of the scheduling of Rel-12 UEs on both eNBs. The SeNB would send the MeNB its channel and load condition and the MeNB decides which resources should be used to schedule Rel-12 UEs on the SeNB carrier, based on the information it receives and the traffic intended to be forwarded to the SeNBs (the latter may only be possible in architecture 3C).

More generally, the step of determining comprises scheduling transmissions from the second base station to the at least one mobile terminal. Optionally, the second base station serves at least one other mobile terminal (which may or may not use carrier aggregation). Then, the method may further comprise scheduling, at the second base station, transmissions from the second base station to the at least one other mobile terminal. Thus, resources for the transmissions from the second base station to the mobile terminal using carrier aggregation may be allocated at a network entity distinct from the second base station (such as the first base station). However, resources for the transmissions from the second base station to other mobile terminals may be allocated at the second base station.

Optionally, the characteristic of the second base station may comprise a traffic load on the second base station. The state of a radio interface between the second base station and the at least one mobile terminal may comprise one or more radio channel conditions, one or more radio link quality parameter and/or a radio link performance parameter.

The characteristic of the second base station may comprise an indication of an amount of data and/or resources for transmission to mobile terminals being served by the second base station of a second type (for instance, without carrier aggregation) functionality and/or an indication of an amount of data and/or resources for transmission to mobile terminals of a first type (for example, with carrier aggregation functionality) being served by the first base station. In other words, information is provided by one or both eNBs about the quantity of data previously transmitted or intended for transmission (or resource allocation used or intended for use) to Rel-12 UEs and/or Rel-8 UEs. In some embodiments, the step of identifying an amount of data and/or resources for transmission by the second base station to the at least one mobile terminal is performed such that the second base station has capacity to transmit data to mobile terminals of the second type (without carrier aggregation functionality) being served by the second base station. In other words, the resource allocation to Rel-12 UEs at the SeNB may be limited in order to ensure fairness to Rel-8 UEs. Additionally or alternatively, the network entity may be configured such that the first base station only allocates resources for transmission to mobile terminals of the first type.

In the preferred embodiment, especially when the network entity is the first base station, the step of receiving information about the service data comprises receiving the service data at the network entity. Then, the method may further comprise communicating at least some of the service data from the network entity to the second base station based on the determined resource allocation.

The method may be implemented by means of a computer program, which will cause the steps to be carried out when operated by a processor (or other logic). The computer program may be stored on a computer readable medium. In another aspect, there may be provided a network entity of a cellular network, configured to manage resources for service delivery to at least one mobile terminal using carrier aggregation across first and second base stations of the cellular network in accordance with the method as described herein. The network entity may have structural features (such as respective components, modules or parts) configured to provide the functionality associated with any of the steps discussed herein. The network entity is preferably the first base station, although it may be the second base station in some embodiments, part of another known network entity or a new network entity.

Any combination of specific features may be provided from any of the aspects discussed above, even if that combination is not explicitly disclosed. Moreover, any part or combination of parts of this aspect may be combined with any other aspect discussed herein.

The invention claimed is:

1. A method for deciding on an activation of downlink carrier aggregation for a carrier of a first base station and a carrier of a second base station of a cellular network for delivering a service to a mobile terminal, the method being performed by the cellular network and comprising:
   determining that the downlink carrier aggregation is to be activated for the mobile terminal, wherein the determining is performed on a basis of a combination of a plurality of parameters comprising:

at least one parameter associated with a performance of the cellular network, wherein the at least one parameter associated with the performance of the cellular network comprises an indication of latency for communication between network entities of the cellular network and a parameter based on an assessment of a change in throughput due to carrier aggregation relative to a change in transmission overheads due to carrier aggregation activation, at least one parameter associated with a Quality of Service requirement of the service, wherein the at least one parameter associated with the Quality of Service requirement of the service comprises one or more of a latency requirement of the service or a minimum bit rate requirement of the service, at least one parameter associated with a state of the mobile terminal, wherein the at least one parameter associated with the state of the mobile terminal comprises a quality of service state, and wherein the quality of service state for the mobile terminal indicates a maximum delay tolerance for the mobile terminal, at least one parameter associated with a radio link between the mobile terminal and the first base station and/or second base station, and at least one parameter associated with a rate of handover between base stations for the mobile terminal;

subsequent to the mobile terminal ratifying activation of the downlink carrier aggregation, receiving an indication from the mobile terminal, the indication indicating that the mobile terminal's ratifying of the downlink carrier aggregation is based on a battery condition of the mobile terminal such that the cellular network receives information describing the mobile terminal's battery conditional; and deciding to activate carrier aggregation if the indication of latency is less than a threshold value;

deciding to activate carrier aggregation if the latency requirement of the service is at least a threshold delay tolerance level; and deciding to activate carrier aggregation if the maximum delay tolerance for the mobile terminal is at least a threshold delay tolerance.

2. The method of claim 1, wherein the at least one parameter associated with the state of the mobile terminal comprises one or more of:
a mobility state;
a quality of service state;
the battery condition; and
a transmission power back-off state.

3. The method of claim 2, wherein the parameter associated with the mobility state is based on one or more of:
Doppler information from a mobile terminal transmission;
a time duration of attachment of the mobile terminal to a base station; and
a location for the mobile terminal.

4. The method of claim 2, wherein the parameter associated with the mobility state indicates whether the mobile terminal is nomadic, the method further comprising deciding to activate carrier aggregation if the mobile terminal is nomadic.

5. The method of claim 2, further comprising:
receiving the parameter associated with the battery condition at the cellular network from the mobile terminal; and
deciding to activate carrier aggregation if the parameter associated with the battery condition indicates that the battery power level is at least a threshold level or deciding not to activate carrier aggregation if the parameter associated with the battery condition indicates that the battery power level is less than the threshold level.

6. The method of claim 2, wherein the transmission power back-off state indicates a transmission power back-off associated with carrier aggregation activation, the method further comprising:
assessing a throughput parameter for carrier aggregation activation based on the indicated transmission power back-off; and
deciding to activate carrier aggregation if the assessed throughput parameter is at least a threshold level.

7. The method of claim 1, wherein the at least one parameter associated with the performance of the cellular network comprises a parameter based on an assessment of a change in throughput due to carrier aggregation activation relative to a change in transmission overheads due to carrier aggregation activation.

8. The method of claim 7, further comprising deciding to activate carrier aggregation if the assessment indicates an increase in throughput due to carrier aggregation activation relative to the change in transmission overheads due to carrier aggregation activation.

9. The method of claim 1, wherein the step of deciding on the activation of carrier aggregation is based on a weighted measure of the plurality of the parameters.

10. The method of claim 1, wherein the parameter associated with the state of the mobile terminal is based on both:
a time duration of attachment of the mobile terminal to a base station; and
a location for the mobile terminal.

11. A computer program product having a non-transient computer readable medium having stored thereon executable code that, when executed by a processor is configured to carry out the method of claim 1.

12. A network entity of a cellular network, configured to set an activation state for carrier aggregation based on a decision made in accordance with the method of claim 1.

* * * * *